Patented Apr. 25, 1944

2,347,358

UNITED STATES PATENT OFFICE 2,347,358

HYDROXYLATION OF ACETYLENIC COMPOUNDS

Nicholas A. Milas, Belmont, Mass., assignor to Research Corporation, New York, N. Y., a corporation of New York No Drawing. Application March 16, 1942, Serial No. 434,980

6 Claims. (Cl. 260—535)

This invention relates to the catalytic oxidation of unsaturated organic compounds, and its principal object is to provide a simple, economical and efficient process of producing useful oxygenated organic compounds such as glycols, phenols, aldehydes, ketones, quinones and organic acids.

Further objects will be apparent from a consideration of the following description wherein I have illustrated the application of my new process in the preparation of various substances constituting the class of oxygenated organic compounds.

The present application, which is a continuation-in-part of my application Serial No. 382,273, filed March 7, 1941, is particularly concerned with the hydroxylation of members of the group of unsaturated organic compounds which contain the acetylenic linkage —C≡C—, which group of compounds includes: acetylene itself; mono-substituted acetylenes of the type $$R—C≡CH$$

wherein R represents a monovalent organic radical; and disubstituted acetylenes of the type $$R—C≡C—R_1$$

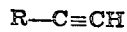

wherein R and $R_1$ represent monovalent organic radicals.

I have found that when an unsaturated organic compound containing the acetylenic linkage is treated with hydrogen peroxide, in an initially substantially anhydrous environment, e. g., in the presence of an essentially anhydrous inert organic solvent, and of a small amount of a catalytically active oxide of a metal known to form very unstable peracids rather than peroxides, including Os, Ti, Zr, Th, V, Nb, Ta, Cr, Mo, W, U and Ru—(see J. A. C. S., 59, pages 2342 and 2343; and Berichte, 41 (1908), page 3536), preferably, osmium tetraoxide, ruthenium tetroxide, vanadium pentoxide, molybdenum oxide or chromium trioxide—in an essentially non-alkaline environment (that is, in the absence of an inorganic base), there is produced an oxygenated organic compound, the nature of which depends upon the particular type of unsaturated compound subjected to such treatment, the temperature, the pressure (if the compound treated be in gaseous phase), the solvent medium, the extent of oxidation and other such factors. For example, acetylene and its mono-, or di-, substitution products yield hydroxy aldehydes and/or hydroxy acids.

The reaction of the acetylenic compounds and hydrogen peroxide may be illustrated by the following equations:

*Monosubstituted acetylene*

(a)

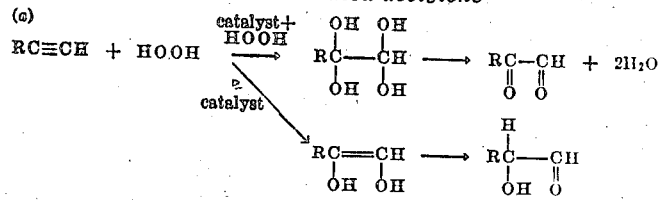

wherein R represents a monovalent organic radical of the group consisting of alkyl and aryl radicals.

The hydroxy and keto aldehydes thus formed may be oxidized further to produce organic acids as follows:

(b) 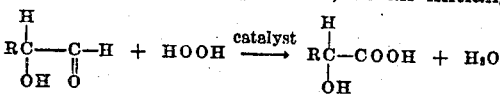

(c) 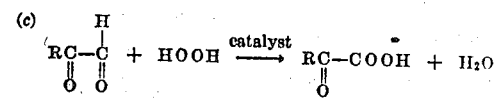

*Disubstituted acetylene*

(a)

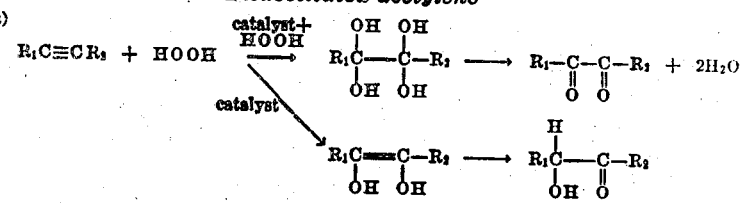

wherein $R_1$ and $R_2$ represent monovalent organic radicals of the group consisting of alkyl and aryl radicals.

The reaction of hydrogen peroxide and acetylene ($C_2H_2$) to produce (a) glyoxal and glycollic aldehyde, (b) glycollic acid, and (c) oxalic acid may proceed as follows:

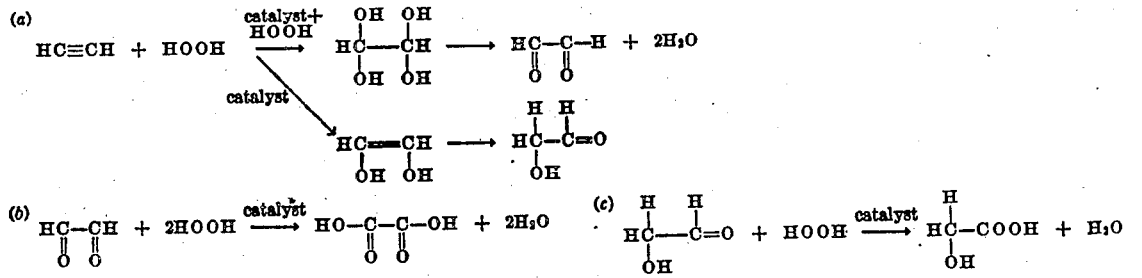

In carrying out my process successfully, it is advisable to employ, as media for the reaction, substantially anhydrous solvents, preferably selected from such organic substances that do not undergo oxidation during the reaction. Tertiary alcohols in general, and particularly tertiary butyl and tertiary amyl alcohols, have been found to be suitable solvents for this purpose, although it is to be understood that the invention is not confined to these solvents since various other reagents, such as nitriles and certain types of ethers, acetic acid-tertiary alcohol mixtures, etc., may be used to advantage. Illustrative of operable nitriles is acetonitrile. Illustrative examples of operable ethers include: ethyl, propyl, butyl and amyl dioxane, ethers of ethylene glycol and diethylene glycol, etc. Among operable inert (that is, unreactive) organic solvent media is nitromethane. The organic solvent employed is, in all cases, strictly a medium or vehicle, and is not a reactant.

The reaction mixture (material to be oxidized, the hydrogen peroxide treating agent, the organic solvent medium—where used—and the catalyst) preferably is initially substantially anhydrous.

A preferred procedure for the preparation of the hydrogen peroxide reagent in tertiary butyl alcohol is as follows:

400 cc. of pure tertiary butyl alcohol is added to 100 cc. of 30% hydrogen peroxide (Albone C), and the solution treated with small portions of anhydrous sodium sulphate, thereby forming two layers. The alcohol layer, containing most of the hydrogen peroxide, is removed. The so separated hydrogen peroxide-rich layer may be used without further treatment; however, I may further dehydrate the same by treating it with more anhydrous sodium sulphate, and finally with anhydrous calcium sulphate or magnesium sulphate. A solution containing approximately 6% hydrogen peroxide in tertiary butyl alcohol is thus obtained, and this solution may be concentrated by vacuum distillation of the alcohol at room temperature to any desired concentration without loss of the peroxide, provided an all-glass or other suitable apparatus is employed.

An osmium tetroxide catalyst may be prepared by dissolving substantially anhydrous osmium tetroxide in substantially pure tertiary butyl alcohol, free from isobutylene.

A chromium trioxide catalyst similarly may be prepared by dissolving substantially anhydrous chromic acid ($CrO_3$) in a substantially pure saturated tertiary aliphatic alcohol $(C_nH_{2n+1})_3COH$, e. g., substantially pure tertiary butyl or amyl alcohol, or in a substantially anhydrous mixture of acetic acid and a tertiary alcohol; or, the substantially anhydrous $CrO_3$ may be added directly in the solid form to the substantially anhydrous medium containing hydrogen peroxide and the substance to be hydroxylated. Preparation of the other catalytic metal oxides may similarly be formed by dissolving the metal oxide in one or another of the organic solvents above stated. Or, the selected catalytic metal oxide may be added, in powdered or finely divided state, to the hydrogen peroxide reagent wherein the same eventually dissolves forming a completely homogeneous solution. The catalyst may be used alone or in combination.

I have found that the temperature plays an important role in directing the type of oxygenated product to be formed. For example, formation of glycols in high yields is usually favored between room temperature (e. g., 21° C.) and several degrees below 0° C., whereas aldehydes, ketones and organic acids are produced more advantageously at temperatures higher than room temperature (e. g., between 21° C. and the boiling point of the non-aqueous solvent employed).

The following examples are illustrative of the application of the invention:

1. GASEOUS UNSATURATED SUBSTANCE

For the production of ethylene glycol or of any glycol from any unsaturated gaseous substance, the latter may be bubbled through the peroxide reagent containing any one of the catalysts above suggested, or any combination of them, or it may be introduced under pressure of various magnitudes from one to several atmospheres or even several hundred atmospheres. The end of the reaction is usually indicated by a color change or by the complete utilization of the peroxide as determined by titration. The glycol or other products may be separated by fractionation or in any other suitable manner.

2. LIQUID AND SOLID UNSATURATED SUBSTANCES

*Hydrocarbons*

The unsaturated hydrocarbons are dissolved or mixed with the peroxide reagent containing a suitable catalyst of the type previously suggested and the reaction is allowed to proceed either at or below room temperature if glycols are desired, or above room temperature if aldehydes, ketones, and organic acids are desired. The hydrocarbons may be present preferably in the ratio of one mole to one or two moles of the peroxide, although greater excess of peroxide is necessary when aldehydes, ketones and acids are desired. The speed of the reaction up to certain limits depends upon the concentration of the catalyst which may be present preferably in concentrations from .05 g. to .5 g. per mole of the substance to be oxidized, although it is to be understood that these limits may at times be exceeded without affecting appreciably the yields of the oxygenated products. The end of the reaction is usually indicated by a color change or by the absence of peroxide. The glycols or other oxygenated products may then be separated either by fractionation or in any other well known manner.

In preparing glyoxal from acetylene by the present process, 1 mole of acetylene is reacted with 2 moles of hydrogen peroxide by bubbling the acetylene through an initially substantially anhydrous solution of hydrogen peroxide in substantially pure tertiary butyl alcohol containing osmium tetroxide dissolved therein, while maintaining the reaction mixture at normal room temperature (i. e., a temperature of about 20–22° C.). The course of the reaction is believed to be as follows: at first the compound

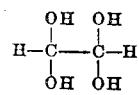

is produced, which unstable compound loses two moles of water and is thereby converted to glyoxal,

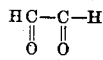

By using only 1 mole of hydrogen peroxide per mole of acetylene, the conditions otherwise being the same, the hydroxylation proceeds mainly to glycollic aldehyde. It is believed that in the course of the reaction the unstable compound

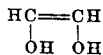

is formed, which latter rearranges to

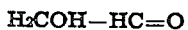

For preparing glycollic acid from glycollic aldehyde, 1 mole of the latter is reacted with 1 mole of HOOH, in the form of the hereinbefore referred to "peroxide reagent," at normal room temperature.

Oxalic acid is prepared from glyoxal by reacting 1 mole of the latter, at room temperature, with 2 moles of HOOH (in the form of "peroxide reagent").

In the same manner, 1,2,4-trihydroxy-butanone-3

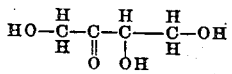

is produced by reacting 1 mole of vinyl acetylene, H₂C=CH—C≡CH, with an amount of peroxide reagent corresponding to 2 moles of hydrogen peroxide, at a temperature of about 0° C. With excess of HOOH, it is possible to form from the vinyl acetylene the unstable compound

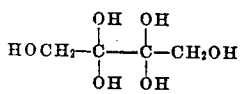

which latter, losing water, is converted to the compound

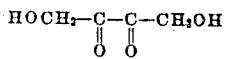

Illustrative of the application of the present hydroxylation process to an hydroxy acetylene compound is the following:

Equimolecular quantities of the peroxide reagent (with either vanadium pentoxide or osmium tetroxide as the catalyst component) and acetylene carbinol,

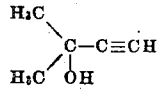

are caused to react at normal room temperature, whereby there is produced 2-methyl-2,4-dihydroxy-butanone-3,

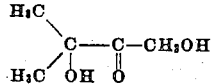

It is believed that in the course of this reaction the initial hydroxylation product is the compound

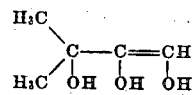

which compound rearranges to yield the 2-methyl-2,4-dihydroxy-butanone-3.

By reacting equimolecular quantities of the peroxide reagent (with osmium tetroxide as the catalyst component) and tetramethyl acetylene glycol,

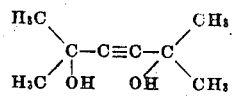

at normal room temperature or below, it is assumed that the initial hydroxylation product is the compound

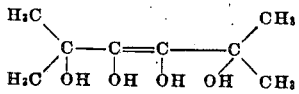

which latter rearranges to form the recoverable final product, 2,5-dimethyl-2,4,5-trihydroxy-hexanone-3,

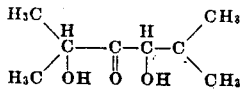

However, with excess of the hydrogen peroxide and by reacting at higher than room temperature, there may be produced the unstable compound

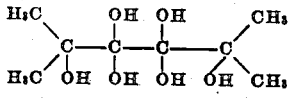

which, under the conditions of reaction, tends to split up to yield 2 moles of 2-methyl-2-hydroxy-propionic acid (or, alpha hydroxy-isobutyric acid).

As another example, 2-hydroxy-butyne,

when reacted with an equimolecular amount of the peroxide reagent (using osmium tetroxide as the catalyst component), at normal room temperature, yields as an initial hydroxylation product the unstable compound

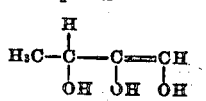

which latter rearranges to give as final product 2,4-dihydroxy-butanone-3,

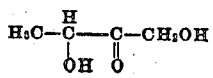

Similarly treated, the starting material 2,4-dihydroxy-hexyne-3

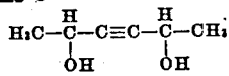

initially yields the unstable compound

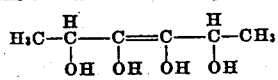

which latter rearranges to give as final product 2,4,5-trihydroxy-hexanone-3,

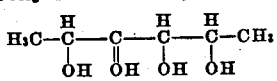

I claim:

1. Process of producing polyhydroxy derivatives of unsaturated organic compounds characterized by containing a triple bond between two adjacent carbon atoms, which comprises treating the acetylenic compound with hydrogen peroxide in a non-alkaline and initially substantially anhydrous environment, in the presence of a catalytically active oxide of a metal which forms unstable peracids, and recovering a polyhydroxy derivative of said acetylenic compound from the resulting reaction mixture.

2. Process of producing polyhydroxy derivatives of acetylenic compounds of the formula $$R_1.C\equiv C.R_2$$

in which $R_1$ and $R_2$ represent monovalent substituents of the group consisting of hydrogen and aliphatic and aromatic radicals, which comprises treating the acetylenic compound with hydrogen peroxide in a neutral and initially substantially anhydrous environment, in the presence of a catalytically active oxide of a metal which forms unstable peracids, and recovering a polyhydroxy derivative of said acetylenic compound from the resulting reaction mixture.

3. Process of producing polyhydroxy derivatives of acetylenic compounds of the formula $$R_1.C\equiv C.R_2$$

in which $R_1$ and $R_2$ represent monovalent substituents of the group consisting of hydrogen and aliphatic and aromatic radicals, which comprises treating the acetylenic compound with a non-alkaline and initially substantially anhydrous solution of hydrogen peroxide in an inert solvent medium, in the presence of a catalytically active oxide of a metal which forms unstable peracids, and recovering a polyhydroxy derivative of said acetylenic compound from the resulting reaction mixture.

4. Process of producing polyhydroxy derivatives of acetylenic compounds of the formula $$R_1.C\equiv C.R_2$$

in which $R_1$ and $R_2$ represent monovalent substituents of the group consisting of hydrogen and alkyl and aryl radicals, which comprises treating the acetylenic compound with a neutral and initially substantially anhydrous solution of hydrogen peroxide in an inert organic solvent medium consisting essentially of a tertiary monohydric saturated aliphatic alcohol, in the presence of a catalytically active oxide of a metal which forms unstable peracids, and recovering a polyhydroxy derivative of said acetylenic compound from the resulting reaction mixture.

5. Process of producing a polyhydroxy derivative of acetylene, which comprises treating the acetylene with hydrogen peroxide in a neutral and initially substantially anhydrous environment, in the presence of a catalytically active oxide of a metal which forms unstable peracids, and recovering a polyhydroxy derivative of said acetylenic compound from the resulting reaction mixture.

6. Process for the production of glycollic aldehyde and glycollic acid from acetylene, which comprises reacting acetylene, at normal room temperature, with a non-alkaline and initially substantially anhydrous solution of hydrogen peroxide in an inert organic solvent medium consisting essentially of a tertiary monohydric saturated aliphatic alcohol, in the presence of osmium tetroxide as catalyst for the reaction, and recovering glycollic aldehyde and glycollic acid from the resulting reaction mixture.

NICHOLAS A. MILAS.